(12) United States Patent
Mikulecky

(10) Patent No.: US 11,330,773 B2
(45) Date of Patent: May 17, 2022

(54) WATERING SYSTEM

(71) Applicant: Garden Variety Water Systems LLC, Highlands Ranch, CO (US)

(72) Inventor: Gregory Scott Mikulecky, Highlands Ranch, CO (US)

(73) Assignee: Garden Variety Water Systems LLC, Highlands Ranch, CO (US)

( * ) Notice: Subject to any disclaimer, the term of this patent is extended or adjusted under 35 U.S.C. 154(b) by 524 days.

(21) Appl. No.: 16/017,937

(22) Filed: Jun. 25, 2018

(65) Prior Publication Data

US 2019/0387696 A1 Dec. 26, 2019

(51) Int. Cl.
*A01G 27/00* (2006.01)

(52) U.S. Cl.
CPC ......... *A01G 27/005* (2013.01); *A01G 27/003* (2013.01); *A01G 27/008* (2013.01)

(58) Field of Classification Search
CPC .. A01G 27/005; A01G 27/003; A01G 27/008; A01G 27/00; A01G 27/001; A01G 27/006; A01G 27/02; A01G 9/02; A01G 9/023; A01G 9/28; A01G 9/247; A01G 9/022
See application file for complete search history.

(56) References Cited

U.S. PATENT DOCUMENTS

| | | | | |
|---|---|---|---|---|
| 1,631,409 A | * | 6/1927 | John | A01G 27/04 47/80 |
| 3,137,096 A | * | 6/1964 | Hopkins | A01G 27/00 47/79 |
| 3,552,058 A | * | 1/1971 | Fici | A01G 27/04 47/79 |
| 4,001,967 A | * | 1/1977 | Swift | A01G 27/02 47/80 |
| 4,885,870 A | * | 12/1989 | Fong | A01G 27/06 47/79 |
| 4,916,858 A | * | 4/1990 | Hobson | A01G 27/04 47/81 |
| 5,749,170 A | | 5/1998 | Furuta | |

(Continued)

FOREIGN PATENT DOCUMENTS

| | | | | |
|---|---|---|---|---|
| CN | 106508626 A | * | 3/2017 | A01G 27/00 |
| DE | 102006039695 | | 2/2008 | |

OTHER PUBLICATIONS

Machine translation of DE 102006039695 to Thai-German Solar Co. Ltd. published Feb. 2008 (cited on Sep. 23, 2019 IDS).*

(Continued)

*Primary Examiner* — Kathleen I Alker
(74) *Attorney, Agent, or Firm* — Craig R. Miles; CR Miles P.C.

(57) ABSTRACT

A watering system including a receptacle including a fluid flow generator and a fluid flow generator controller which releasably couples to a fluid reservoir containing a fluid which can be transferred by operation of the fluid flow generator from the fluid reservoir to a plurality of fluid flow meters which can be disposed in spaced apart relation to correspondingly deliver the fluid to a plurality of spaced apart locations. In particular embodiments, a plurality of potted plants can be disposed in spaced apart relation and one more of the plurality of fluid flow meters can be correspondingly located to deliver the fluid to each of the plurality of potted plants.

13 Claims, 10 Drawing Sheets

(56) References Cited

U.S. PATENT DOCUMENTS

| | | | |
|---|---|---|---|
| 6,345,470 B1* | 2/2002 | Slaght | A01G 27/02 47/79 |
| 8,146,292 B2* | 4/2012 | Brandstatter | A01G 27/02 47/79 |
| 8,408,229 B2* | 4/2013 | Goldberg | A01G 27/001 137/78.3 |
| 9,374,951 B2 | 6/2016 | Church et al. | |
| 2006/0150505 A1 | 7/2006 | Wang | |
| 2008/0072835 A1 | 3/2008 | Hongtawornsiri | |
| 2010/0064581 A1* | 3/2010 | Johnson | A01G 27/008 47/79 |
| 2011/0083761 A1 | 4/2011 | Evans | |

OTHER PUBLICATIONS

Machine translation of CN 106508626 to Wei, published Mar. 2017.*
PCT International Patent Application No. PCT/US19/37499; International Search Report and Written Opinion of the International Searching Authority dated Sep. 10, 2019, 17 pages.

* cited by examiner

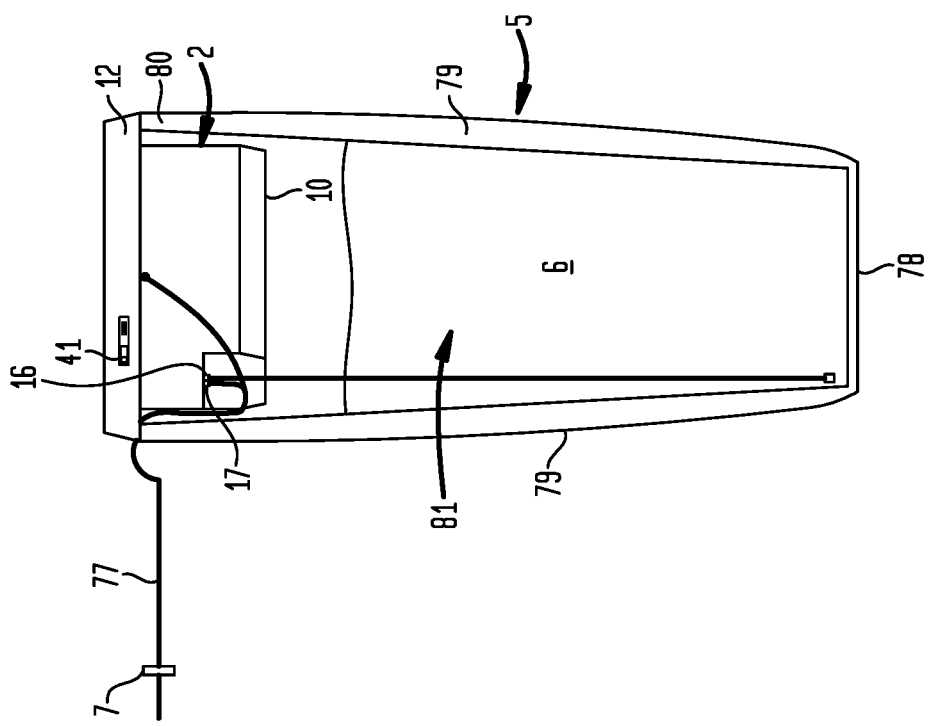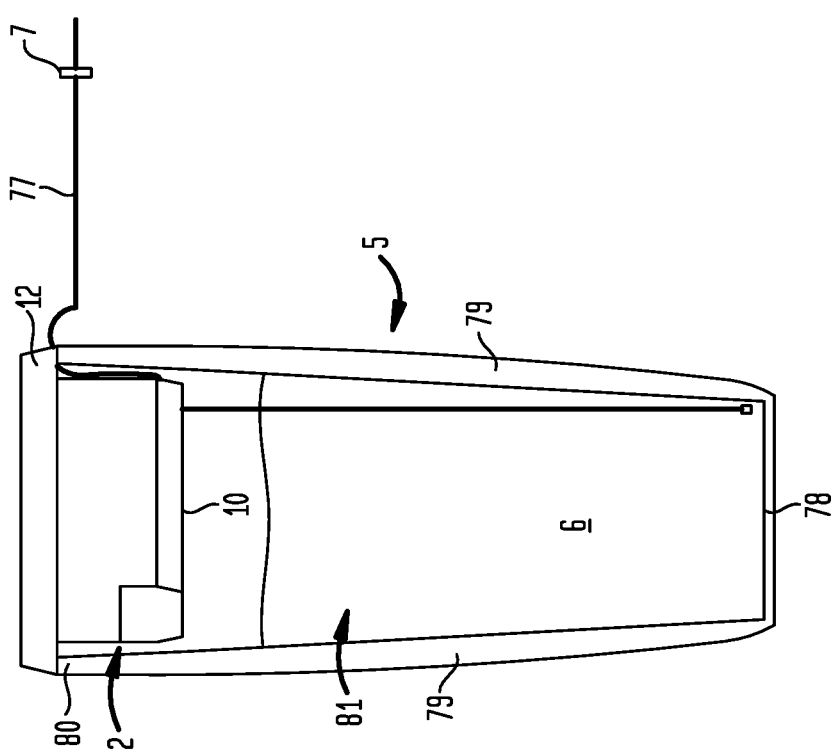

WATERING SYSTEM

I. FIELD OF THE INVENTION

A watering system including a receptacle, including a fluid flow generator and a fluid flow generator controller, which releasably couples to a fluid reservoir containing a fluid which can be transferred by operation of the fluid flow generator from the fluid reservoir to a plurality of fluid flow meters which can be disposed in spaced apart relation to correspondingly deliver the fluid to a plurality of spaced apart locations. In particular embodiments, a plurality of potted plants can be disposed in spaced apart relation and one more of the plurality of fluid flow meters can be correspondingly located to deliver the fluid to each of the plurality of potted plants.

II. BACKGROUND OF THE INVENTION

Increasingly, living areas such as patios, decks, terraces, balconies may not be fitted with conventional plumbing fixtures to deliver water. Additionally, conventional container transport of water or solutions of water with other nutrients, stimulators, or additives may be a manual process that that must be frequently repeated to properly water potted plants disposed in such living areas.

There would be a substantial advantage in a device which could be readily assembled in such an area and that operates to automatically or semi-automatically deliver water or solutions of water from a fluid reservoir to plurality of potted plants.

III. SUMMARY OF THE INVENTION

Accordingly, a broad object of embodiments of the invention can be to provide a watering system which can be used discrete from any water delivered by conventional plumbing fixtures, even though conventional plumbing fixtures may exist. Particular embodiments of the invention can be used in the absence of any water delivered by conventional plumbing fixtures to deliver a fluid to a plurality of fluid flow meters which can be disposed in spaced apart relation to correspondingly deliver the fluid to a plurality of spaced apart locations. In particular embodiments, a plurality of potted plants can be disposed in spaced apart relation and one more of the plurality of fluid flow meters can be correspondingly located to deliver the fluid to each of the plurality of potted plants.

Another broad object of embodiments of the invention can be to provide a device including a receptacle housing a fluid flow generator and a fluid flow generator controller which as one-piece releasably couples to a fluid reservoir adapted to contain a fluid which can be transferred by operation of the fluid flow generator from the fluid reservoir to a plurality of fluid flow meters which can be disposed in spaced apart relation to correspondingly deliver the fluid to a plurality of spaced apart locations.

Another broad object of embodiments of the invention can be to provide a method of making a device including joining a receptacle bottom panel to an interconnected plurality of receptacle side panels upwardly extending to a receptacle rim, said receptacle defining a receptacle open-ended interior space, receptacle compartments and a receptacle open ended passthrough adjoined to the open ended interior space between the receptacle rim and the bottom panel, and disposing a fluid flow generator and a fluid flow generator controller within the receptacle compartments.

Another broad object of embodiments of the invention can be to provide a method of using a device including: supportingly engaging a receptacle with a fluid reservoir, where the receptacle as one-piece includes a receptacle bottom panel joined to an interconnected plurality of receptacle side panels upwardly extending to a receptacle rim defining an open ended receptacle interior space, and having at least one receptacle compartment, and operating a fluid flow generator housed in the receptacle compartment to generate a flow of a fluid from a fluid flow generator inlet disposed in a fluid contained in the fluid reservoir to an outlet disposed external to said fluid reservoir to deliver the fluid to the receptacle interior space or to one or more fluid flow generator outlets.

Naturally, further objects of the invention are disclosed throughout other areas of the specification, drawings, photographs, and claims.

IV. BRIEF DESCRIPTION OF THE DRAWINGS

Figure 7:
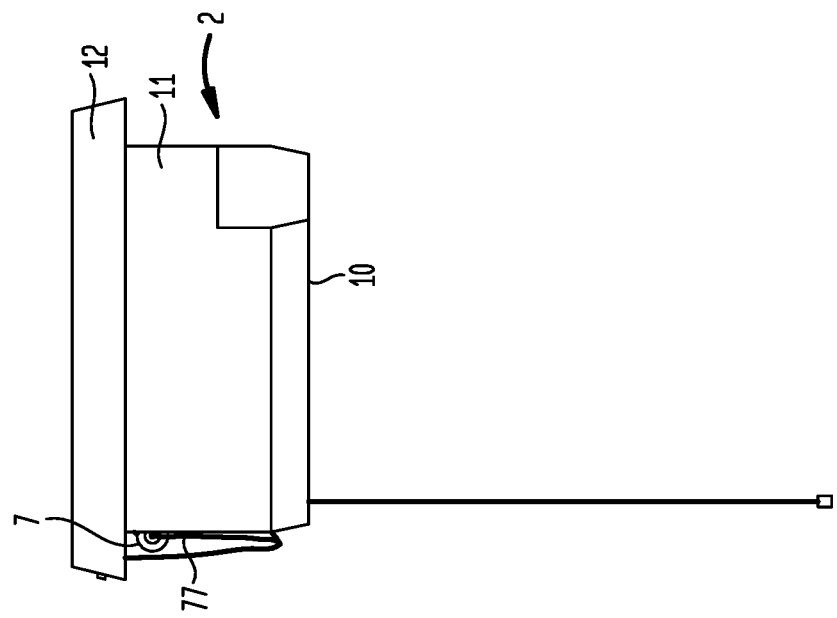
Figure 6:
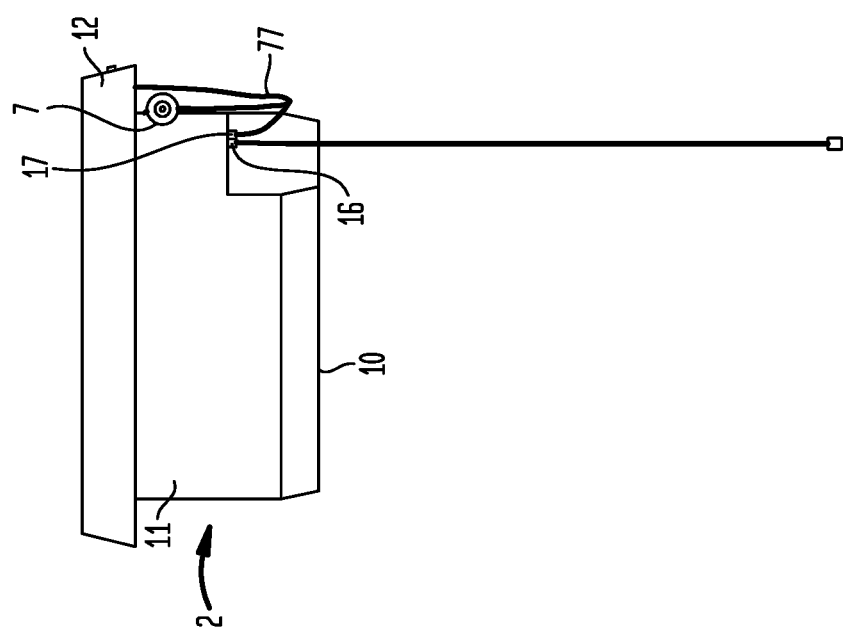
FIG. 6 is a left elevation view of a particular embodiment of a receptacle.

FIG. 7 if a right elevation view of a particular embodiment of a receptacle.

Figure 8:
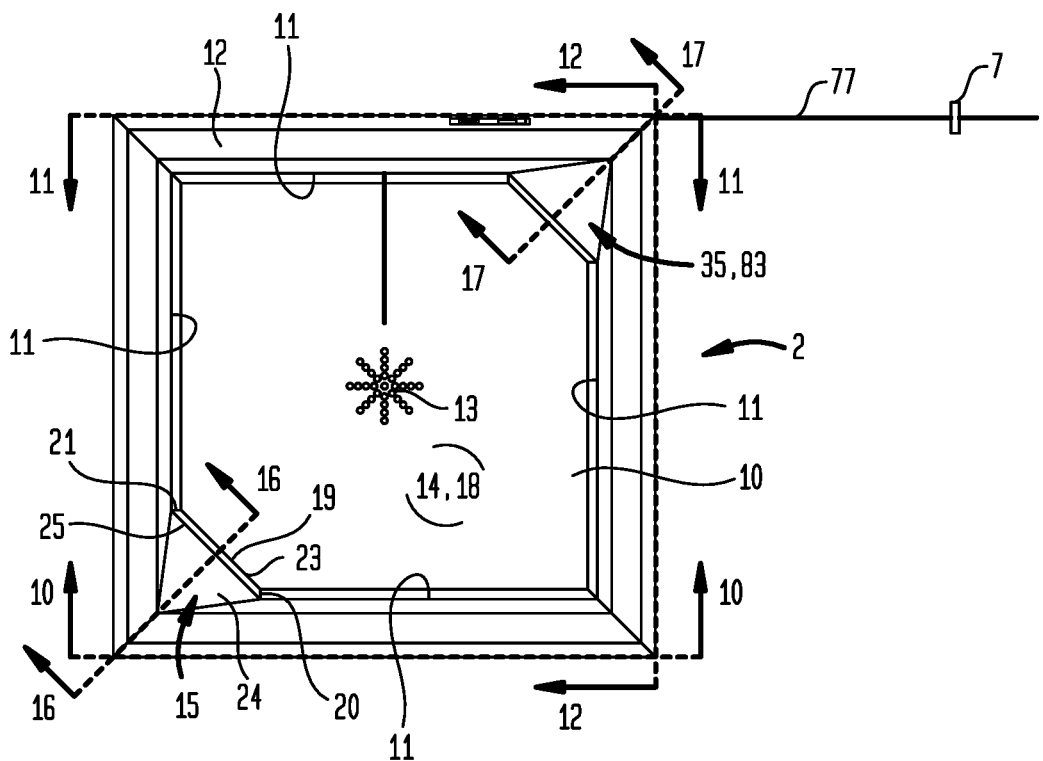

FIG. 8 is a top plan view of a particular embodiment of a receptacle.

Figure 9:
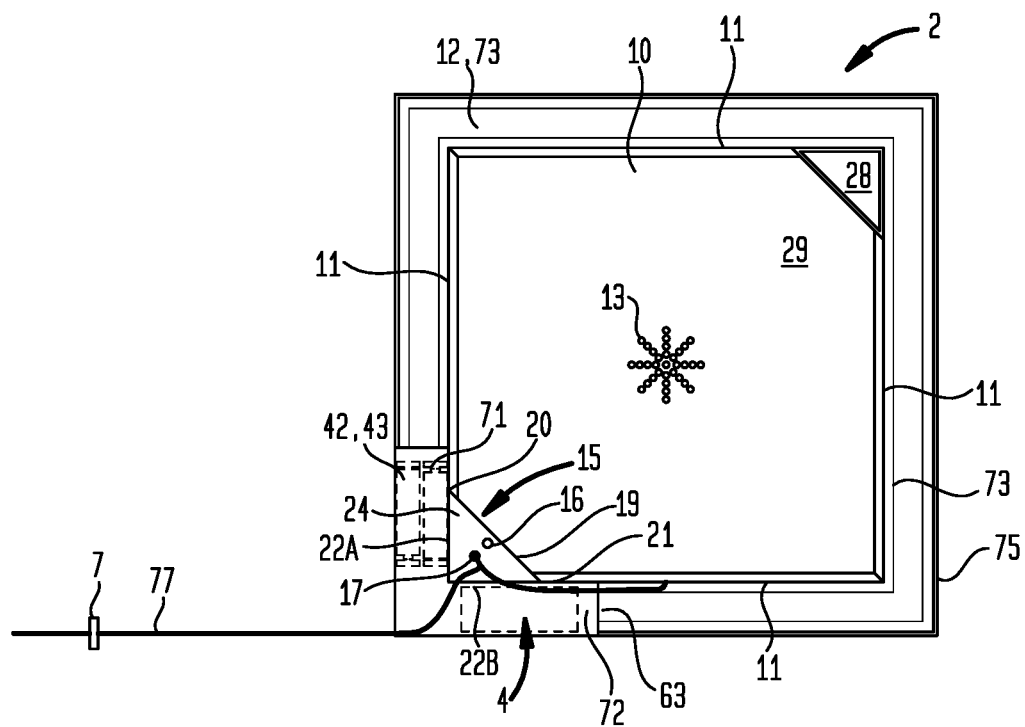

FIG. 9 is a bottom plan view of a particular embodiment of a receptacle.

FIG. 10 is a cross section view 10-10 of FIG. 8 showing a particular embodiment of a receptacle supportingly engaged to a fluid reservoir.

FIG. 11 is a cross section 11-11 of FIG. 8 showing a particular embodiment of a receptacle supportingly engaged fluid reservoir.

Figure 12:
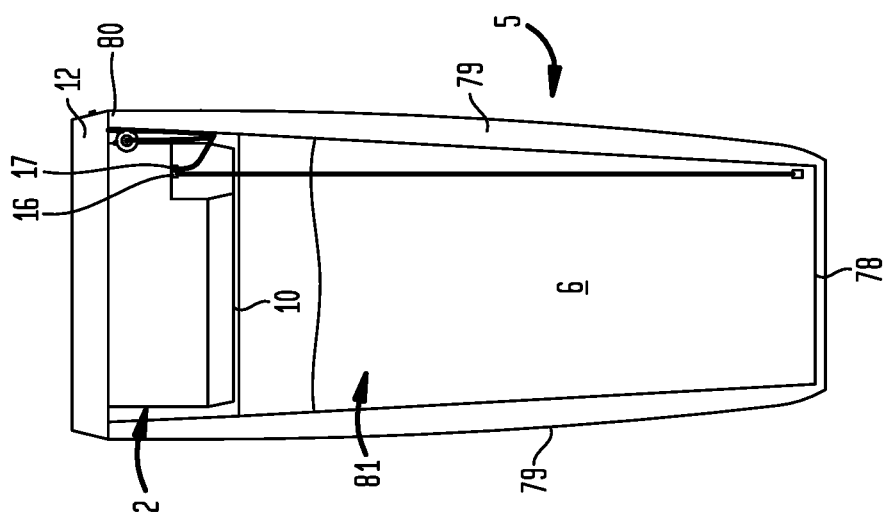

FIG. 12 is a cross section 12-12 of FIG. 8 showing a particular embodiment of a receptacle supportingly engaged a fluid reservoir.

Figure 13:
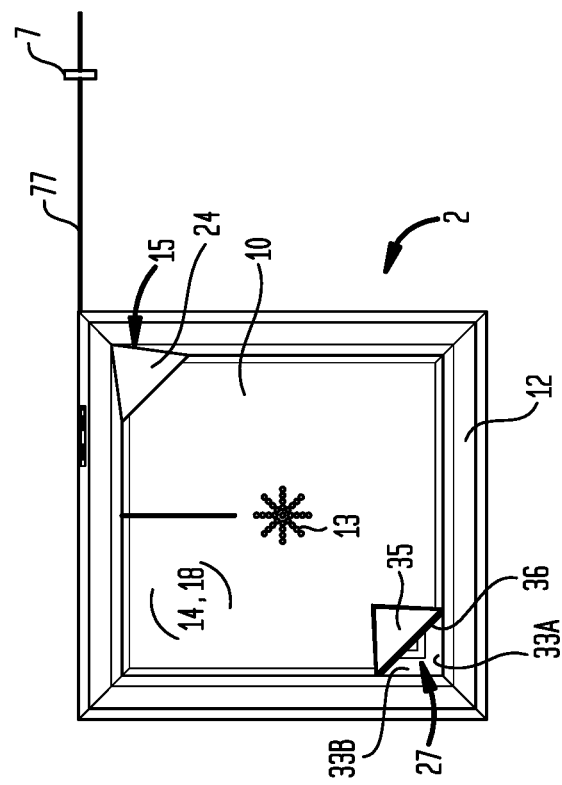

FIG. 13 is a top plan view of a particular embodiment of a receptacle supportingly engaged to a fluid reservoir.

Figure 14A:
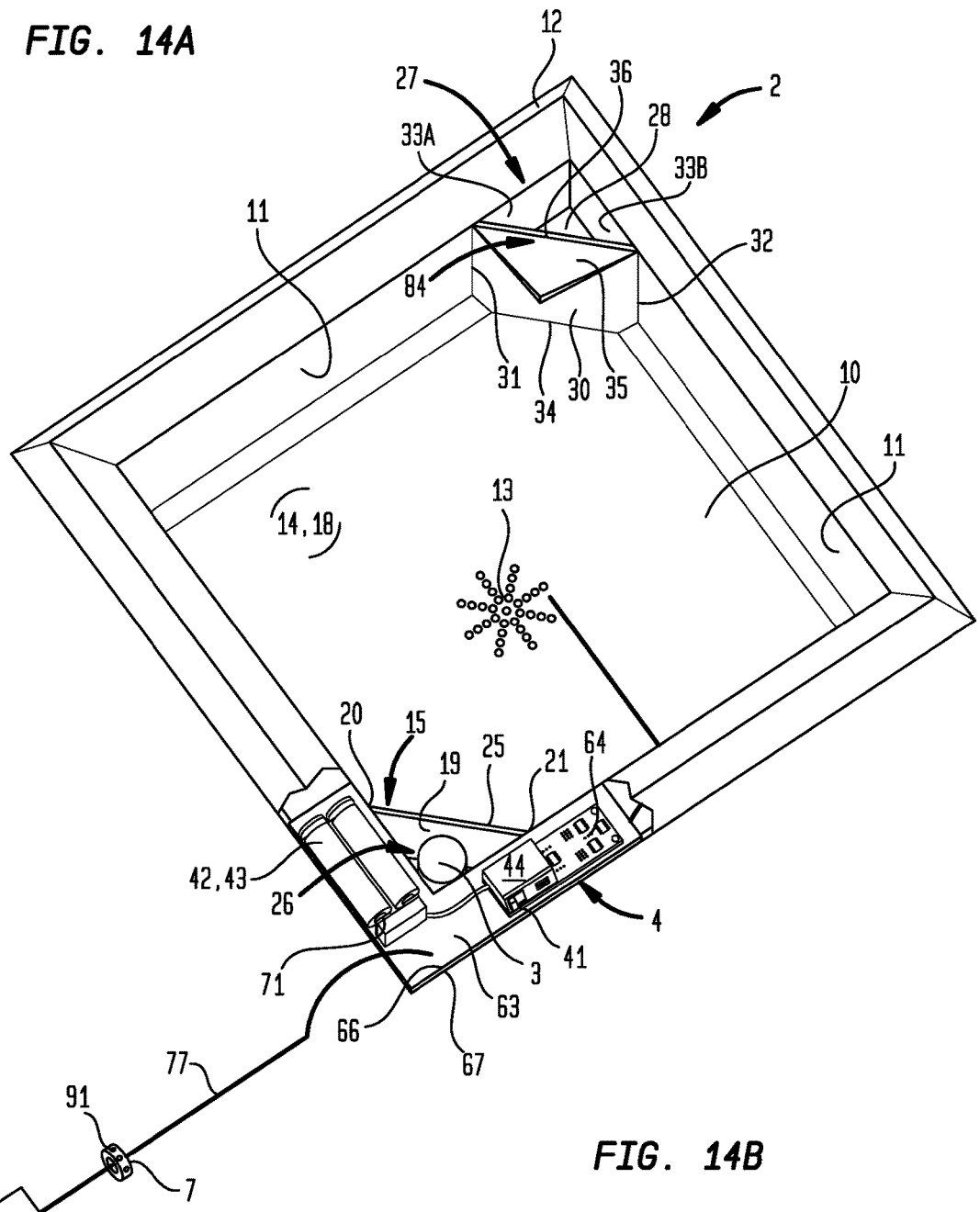

FIG. 14A is a perspective view of a particular embodiment of a receptacle having a portion of the receptacle rim cut away to illustrate an embodiment of a controller and power source.

Figure 14B:
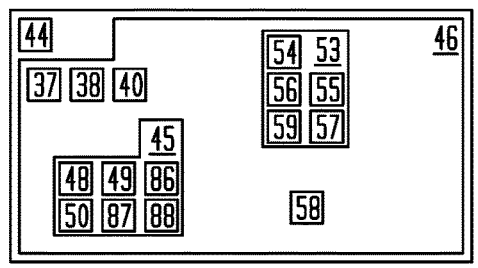

FIG. 14B is a block diagram of controller program modules contained in a non-transistory computer readable media communicatively coupled to a controller processor.

Figure 15:
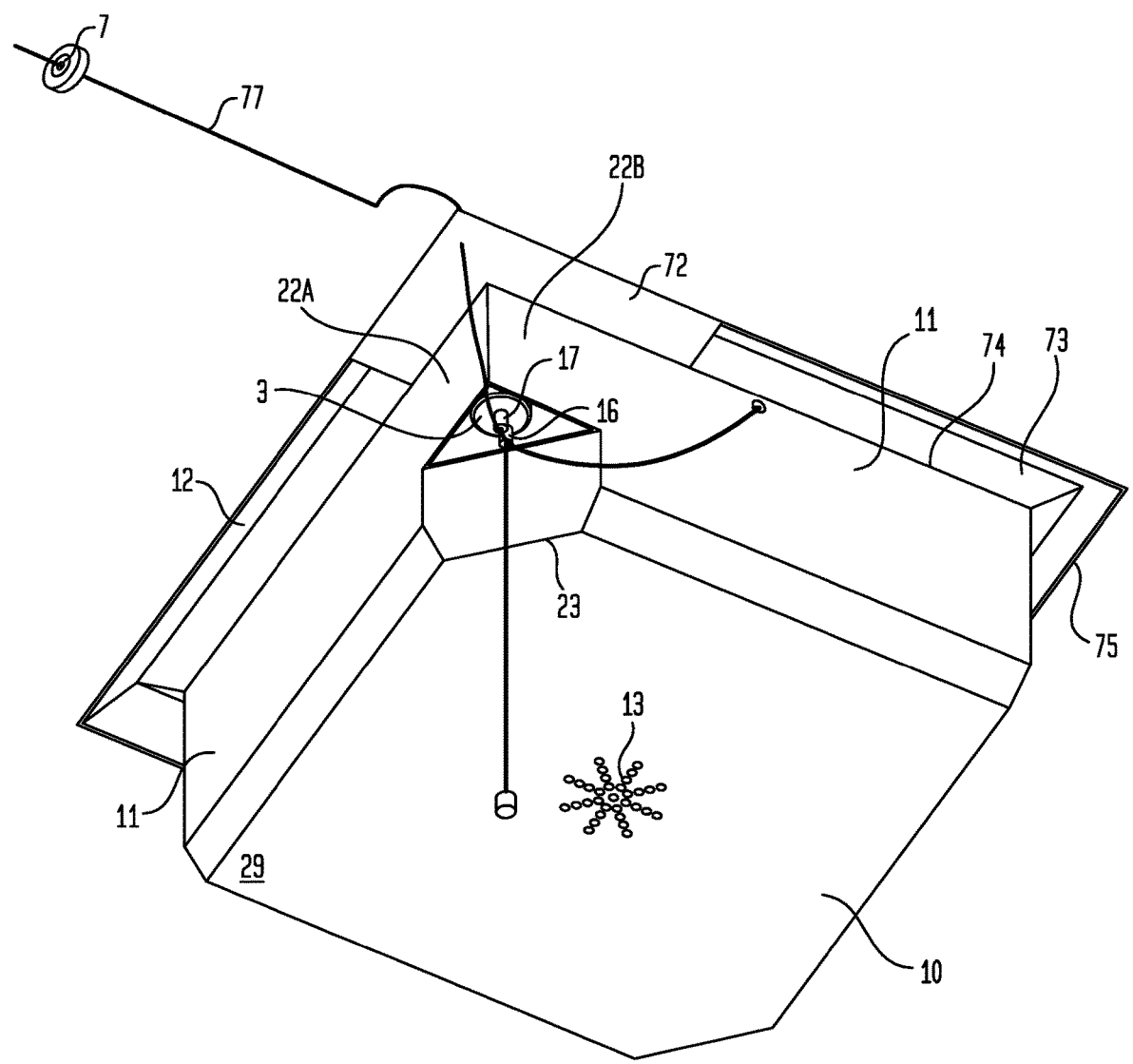

FIG. 15 is a bottom perspective view of a particular embodiment of a receptacle.

Figure 16:
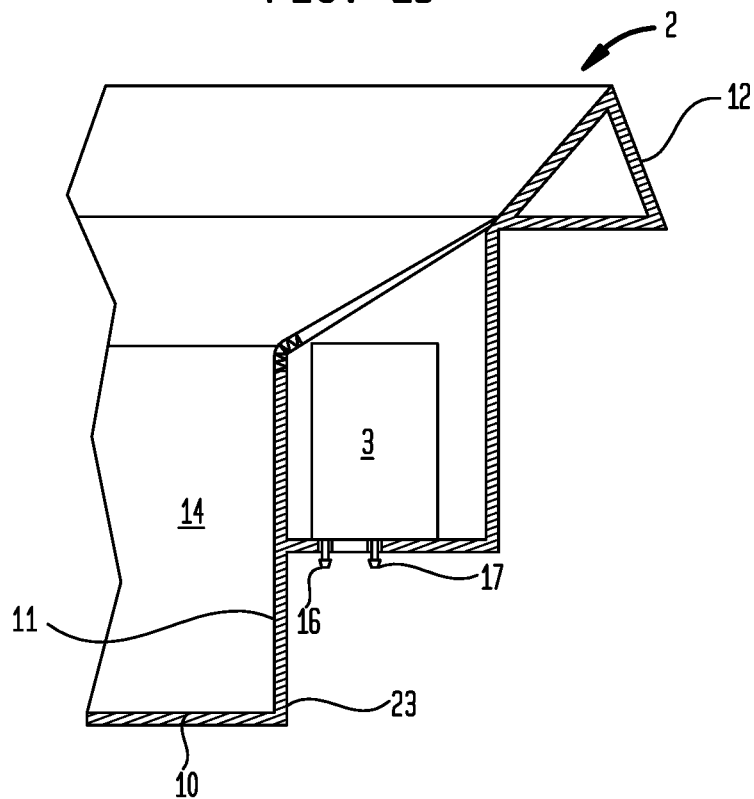

FIG. 16 is a cross section 16-16 of FIG. 8 showing a particular embodiment of a receptacle compartment.

Figure 17:
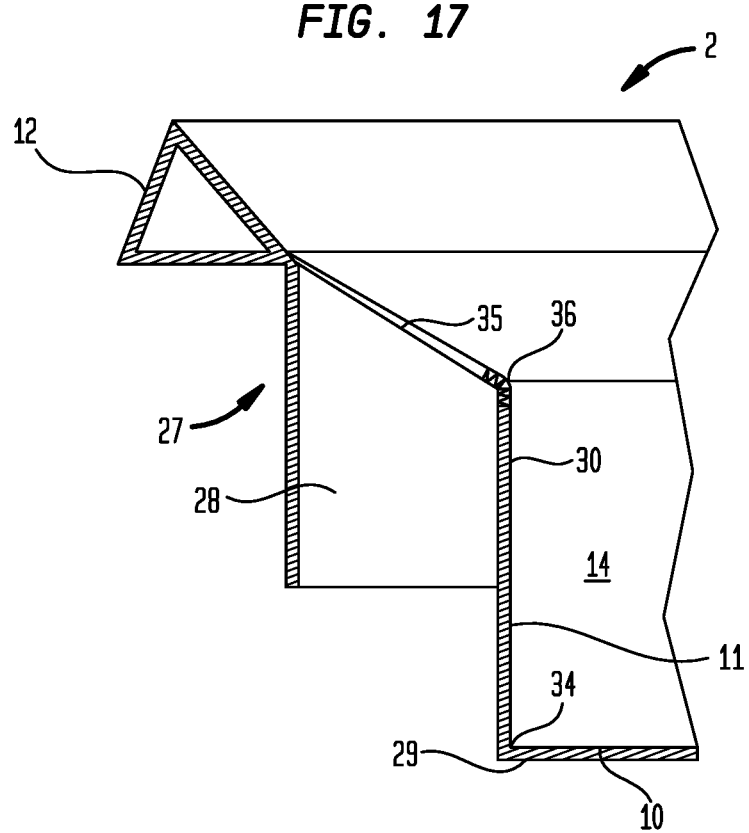

FIG. 17 is a cross section 17-17 of FIG. 8 showing a particular embodiment of a passthrough conduit.

V. DETAILED DESCRIPTION OF THE INVENTION

Now referring generally to FIGS. 1 through 17, embodiments of a watering system (1) including a receptacle (2)

including a fluid flow generator (3) and a fluid flow generator controller (4) which releasably couples to a fluid reservoir (5) which can contain a fluid (6) transferrable by operation of the fluid flow generator (3) from the fluid reservoir (5) to one or more fluid flow meters (7) which can be disposed in spaced apart relation to correspondingly deliver the fluid (6) to a plurality of spaced apart locations (8). In particular embodiments, a plurality of potted plants (9) can be disposed in spaced apart relation and one more of the plurality of fluid flow meters (7) can be correspondingly located to deliver the fluid to each of the plurality of potted plants (9).

Now referring primarily to FIGS. 2 through 15, embodiments of the receptacle (2) include a receptacle bottom panel (10) joined to an interconnected plurality of receptacle side panels (11) which upwardly extend to a receptacle rim (12). While the receptacle (2) shown in the Figures has a receptacle rim (12) which defines a generally square polygon, this illustrative example is not intended to preclude a receptacle rim (12) defining other geometries including or consisting of: polygons have a greater or lesser number of interconnected receptacle side panels (11), circles, ovals, ellipses, or combinations thereof. An aperture element (13) can, but need not necessarily, be disposed in the receptacle bottom panel (10). The receptacle (2) defines an open ended interior space (14) and a receptacle compartment (15) adjoining the open ended interior space (14) between a receptacle rim (12) and a receptacle bottom panel (10). A fluid flow generator (3) can be disposed within the receptacle compartment (15) with a fluid flow generator inlet (16) and a fluid flow generator outlet (17) disposed external to the receptacle compartment (15).

As shown in the illustrative example of FIGS. 2 through 9, the receptacle (2) having four interconnected receptacle side panels (11) joined to a receptacle bottom panel (10) can define a generally square open ended interior space (18). The receptacle compartment (15) can be formed by joining a compartment panel (19) having a first compartment panel side edge (20) opposing a second compartment panel side edge (21) to a corresponding pair of adjoined receptacle sides (22A)(22B). The compartment panel bottom edge (23) can join the receptacle bottom panel (10). A compartment cover (24) can be fixedly or removably engaged with the compartment panel top edge (25) and the corresponding pair of adjoined receptacle sides (22A)(22B) to afford a closed end or open end compartment volume (26)(as shown in the example of FIG. 16 in which to dispose the fluid flow generator (3).

Now referring primarily to FIGS. 2 and 13 through 14A, in particular embodiments, the receptacle (2) can further include a passthrough conduit (27) defining an open ended passthrough (28) communicating proximate the receptacle rim (12) and the bottom panel external surface (29) (as shown in the illustrative example of FIG. 9). A fluid (6) can be transferred through the passthrough conduit (27) to egress from the passthrough conduit (27) at a location inside the area delimited by the receptacle rim (12). In the illustrative example of the Figures, the passthrough conduit (27) can be formed by joining a conduit panel (30) having a first conduit panel side edge (31) opposing a second conduit panel side edge (32) to a corresponding pair of adjoined receptacle sides (33A)(33B). The conduit panel bottom edge (34) can join the receptacle bottom panel (10). The area of the receptacle bottom panel (10) inside of the passthrough conduit (27) can be omitted or apertured to generate the open ended passthrough (28). A passthrough conduit cover (35) can be removably engaged with the conduit panel top edge (36) and the corresponding pair of adjoined receptacle sides (33A)(33B) to afford closure of the passthrough conduit (27).

Now referring primarily to FIGS. 2, 3, 9, 14A and 14B, in particular embodiments, the receptacle (2) can further include a controller (4) which functions to regulate operation of the fluid flow generator (3). In particular embodiments, the controller (4) can include a toggle function (37), to switchably transition the fluid flow generator (3) between an on condition (38) in which the fluid flow generator (3) operates to generate a fluid flow (39) between the fluid flow generator inlet (16) and the fluid flow generator outlet (17) and an off condition (40) in which the fluid flow generator (3) does not operate and does not generate a fluid flow (39). In particular embodiments, the toggle function (37) can be performed by user interaction with a mechanical switch (41), which electrically couples the fluid flow generator (3) to a power source (42), such as a battery (43). While a mechanical switch is described herein as one embodiment, this is not meant to limit the breadth of the types of switches which can perform the toggle function (37), including a manual switches or microprocessor controlled time switch circuit (45), or other like switch.

Now referring primarily to FIGS. 14A and 14B, in particular embodiments, the controller (4) can further comprise a microprocessor (44) including a toggle function (37) which can be operated by a time switch circuit (45) which switches automatically at the pre-programmed time(s) stored in a memory element (46). In particular embodiments, the microprocessor (44) can be user (47) programmed by filling the current time (48) (or current date and time) and filling future start time(s) (49) (or future start date and time) at which the fluid flow generator (3) can be switched on and filling future stop time(s)(50) (or future stop date and time) in the memory element (46). The fluid flow generator (3) by operation of the controller (4) can be switched to the on condition (38) automatically at the future start dates or times (49) and automatically switched to the off condition (40) at the future stop time(s) (50).

Figure 1:
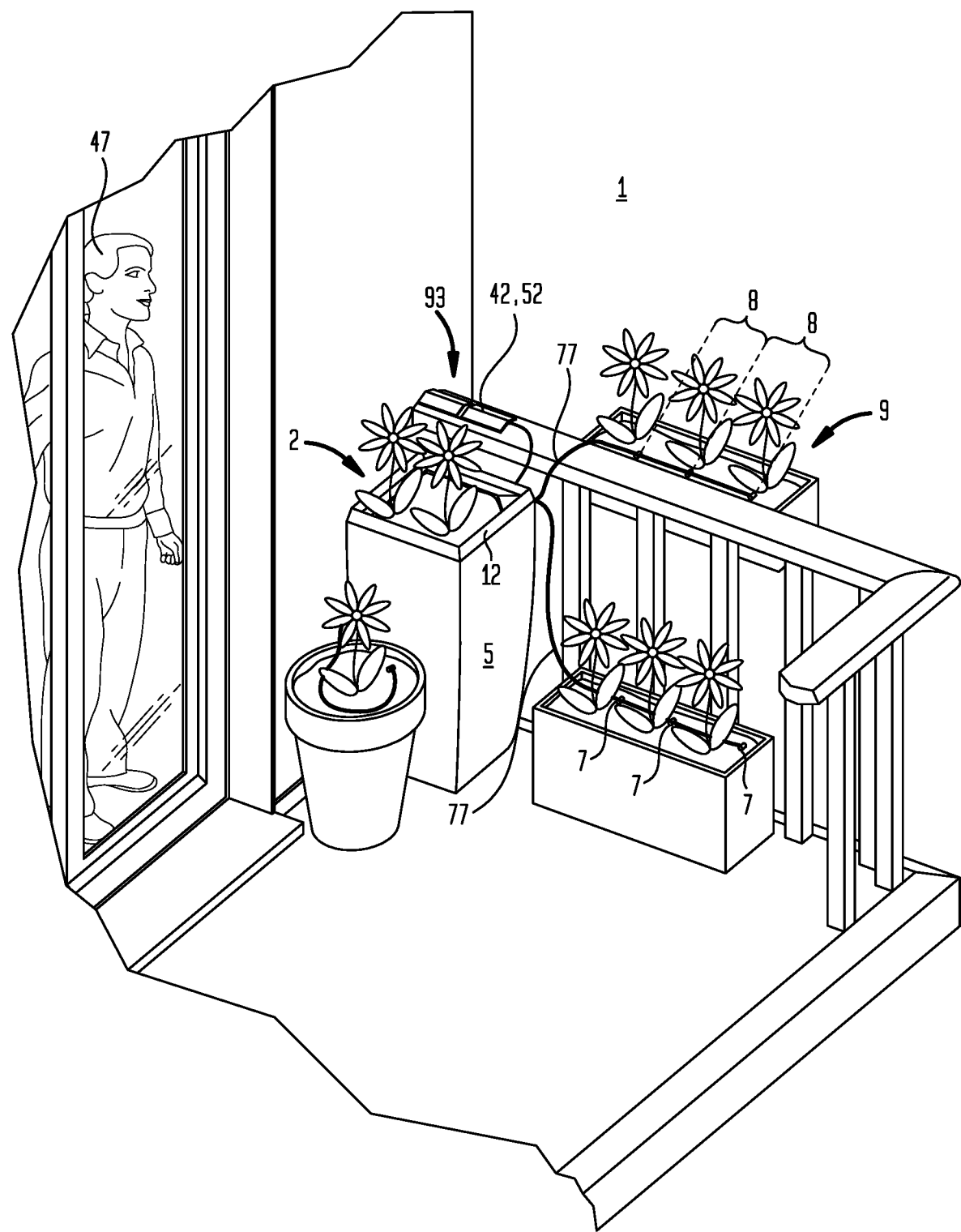
FIG. 1 is a perspective view of a particular embodiment of a watering system.
Figure 2:
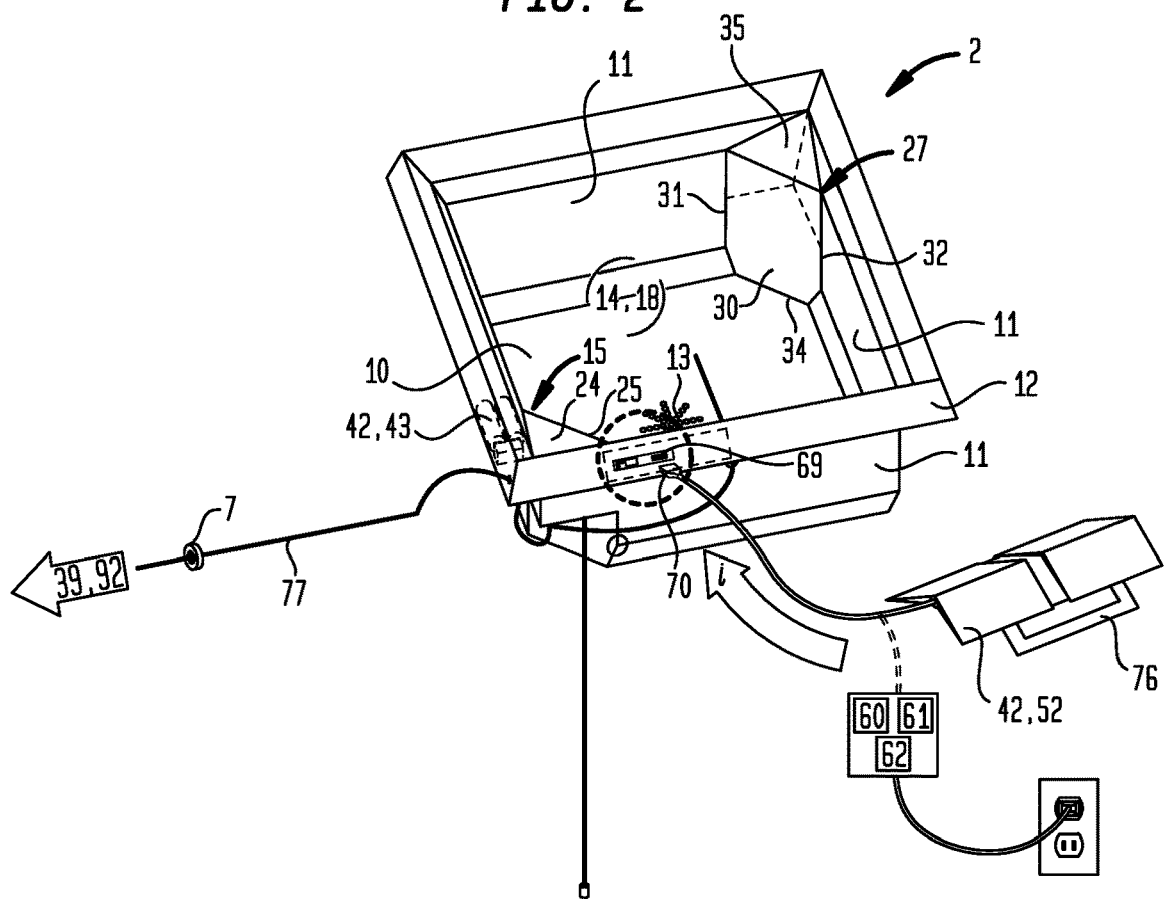
FIG. 2 is a perspective view of a particular embodiment of receptacle coupled to a power source.
Figure 3:
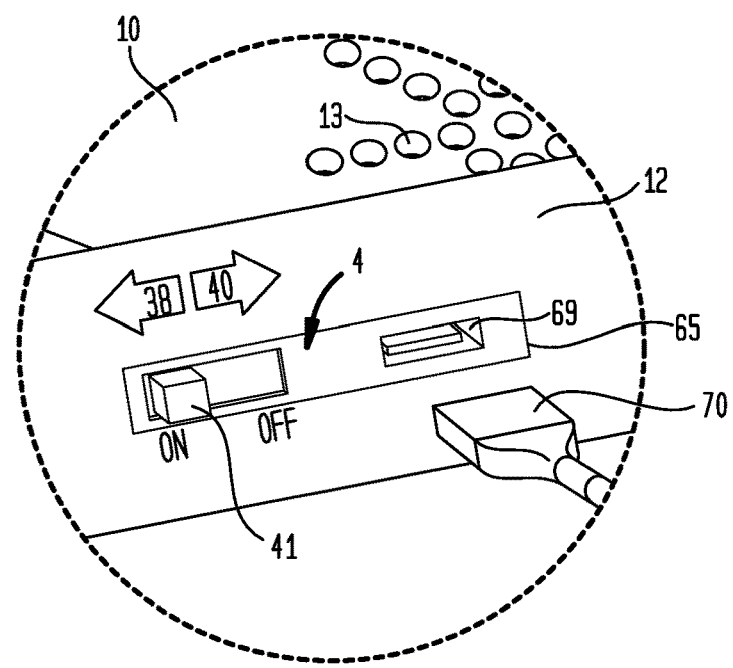
FIG. 3 is an enlarged perspective view of a particular embodiment of a fluid flow generator controller.
Figure 5:
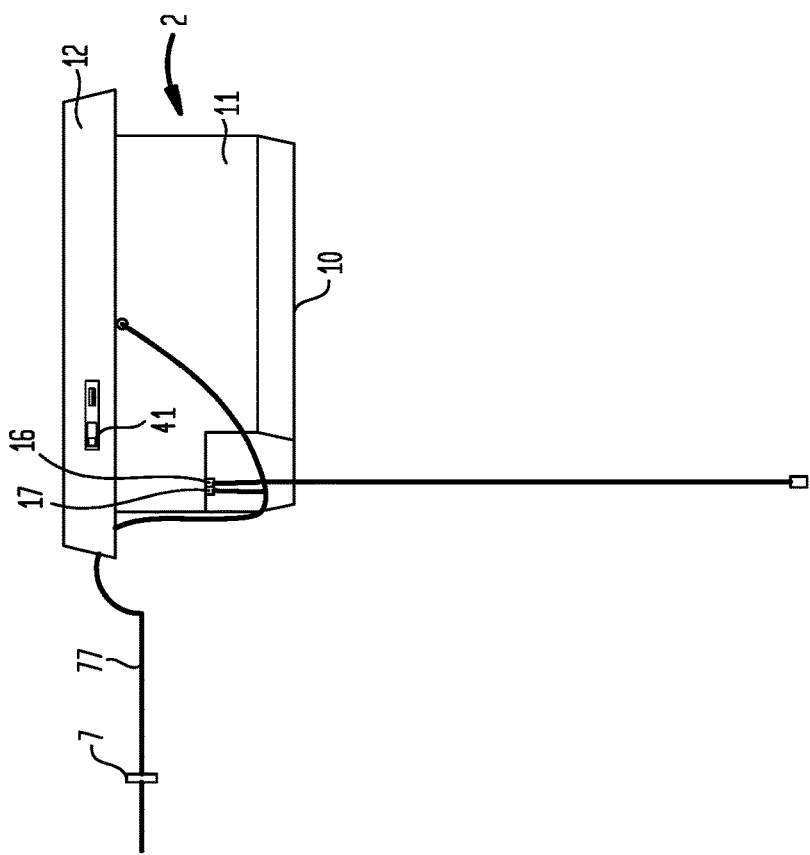
FIG. 5 is a front elevation view of a particular embodiment of a receptacle.
Figure 4:
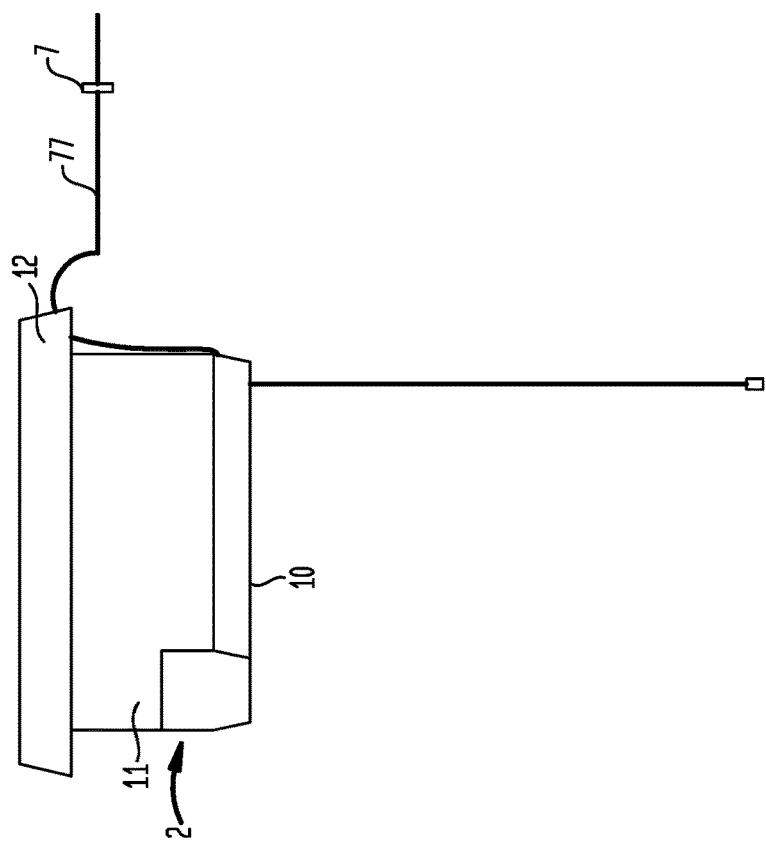
FIG. 4 is a rear elevation view of a particular embodiment of a receptacle.

Now referring primarily to FIGS. 1 and 2, particular embodiments can further include a power source (42) electrically coupled to the controller (4) and switchably connected to the fluid flow generator (3). The power source (42) can comprise a battery (43), such as a dry cell battery, or a photovoltaic solar panel (52) (also referred to as a "solar panel"). As to particular embodiments, the power source (42) can comprise a combination of a battery (43) and a solar panel (52) both electrically coupled to the controller (4) and switchably connected to the fluid flow generator (3). In these particular embodiments, the controller (4) can further include an electrical source selector (53) which functions to determine an amount of current (i) generated by the solar panel (52) and switchably couples the fluid flow generator (3) to the battery (43) or to the solar panel (52) (or both) depending upon the amount of current (i) being generated by the solar panel (52). In particular embodiments, the electrical source selector (53) can further function to calculate a current generation value (54) which varies based on the amount of current (i) generated by the solar panel (52). The electrical source selector (53) can subsequently compare the current generation value (54) to one or more pre-determined current generation threshold values (55). Where the fluid flow generator (3) occurs in the on condition (38), but the determined current generation value (54) fails to exceed a pre-determined current generation threshold value (55), the controller (4) can switchably electrically couple the fluid flow generator (3) solely to the battery (43). Where the fluid flow generator (3) occurs in the on condition (38), and the determined current generation value (54) exceeds a first pre-determined current generation threshold value (56), the controller (4) can switchably electrically couple the fluid flow generator (3) to the battery (43) and the solar panel (52). Where the fluid flow generator (3) occurs in the on condition (38), and the determined current generation value (54) exceeds a second pre-determined current generation threshold value (57), the controller (4) can switchably electrically couple the fluid flow generator (3) solely to the solar panel (52).

In particular embodiments, the controller (4) can, but need not necessarily, further include a battery charger (58) which functions to charge the battery (43) with current (i) generated by the solar panel (52). Typically, when the fluid flow generator (3) occurs in the off condition (40), and the determined current generation value (54) exceeds a third pre-determined current generation threshold value (59), the controller (4) can switchably electrically couple the battery (43) to the battery charger (58) to be charged by current (i) generated solely by the solar panel (52). In particular embodiments, the battery charger (58) can be coupled to an alternate power source (60) such as a 12 volt direct current source (61) which in certain embodiments can be converted or transformed from 110 volt alternating current (62).

Now referring primarily to FIGS. 2, 3, 14A and 14B, embodiments can further include a controller compartment (63) adjoined to said open ended interior space (14) between the receptacle rim (12) and the receptacle bottom panel (10). The controller (4) and associated circuitry (which can be laid down on a printed circuit board (64)) can be disposed inside of the controller compartment (63). The controller compartment (63) can have a controller compartment aperture (65) between the internal and external surfaces (66)(67) of the controller compartment (63). A manually operated mechanical switch (41) and a power inlet coupler (69) can be accessibly aligned with the controller compartment aperture (65) to allow switchable operation of the mechanical switch (41) and releasable mating of a power cord (70) with the power inlet coupler (69) through which current (i) can flow from the solar panel (52) or other external power sources (42)(43)(60)(or combinations thereof) to the controller (4) and switchably connected to the fluid flow generator (3). A battery holder (71) can be further disposed in the controller compartment (63) to hold a battery (43) which can be electrically coupled to the controller (4) and switchably connected to the fluid flow generator (3).

Again, referring primarily to FIGS. 2, 3, 14A and 14B, in particular embodiments, the controller compartment (63) can be disposed within the receptacle rim (12). The receptacle rim (12) can radially outwardly and downwardly extend from the interconnected plurality of receptacle side panels (11) to afford a downwardly facing recess of sufficient volume to define the controller compartment (63) which can remain open or be releasably covered by a controller compartment cover (72). As shown in the illustrative examples, the receptacle rim (12) can be configured as an open sided annular channel (73) having an interior annular edge (74) circumferentially coupled to the interconnected plurality of receptacle side panels (11) and an external annular edge (75) disposed a distance radially outward of the interior annular edge (74)(as shown in the examples of FIGS. 9 and 15). The controller (4) (or printed circuit board (64) including the controller (4) and associated circuitry laid down on the printed circuit board (64)) along with a battery holder (71) and battery (43) can be disposed in the annular channel (73) of the receptacle rim (12)(as shown in the illustrative examples of FIGS. 9 and 14).

Now referring primarily to FIGS. 1 and 2, embodiments can further include a solar panel mount (76) fixedly coupled or releasably coupled to the solar panel (52). In particular embodiments, the solar panel mount (76) can be fixedly or releasably mountable to the receptacle rim (12) of the receptacle (2), or can be releasably mounted to another structure sufficiently proximate the receptacle (2) to supply power from the solar panel (52) to the controller (4) to switchably operate the fluid flow generator (3), such as, the solar panel (52) can be mounted to or supported by any architectural element that makes up a building, deck, patio, fence, balcony, or to other objects such as tables, chairs, stool, stand, tripod, or the like.

Now referring primarily to FIGS. 1 and 2, embodiments can further include a plurality of fluid flow meters (7) fluidically coupled to said fluid flow generator outlet (17) by one or more fluid flow conduits (77). Each of the fluid flow meters (7) can deliver a pre-determined fluid flow (39) in the on condition (38) of the fluid flow generator (3). In particular embodiments, the fluid flow conduit (77) and the fluid flow meters (7) can comprise conventional fluid conduit and fluid emitters, such as, drip, mister, sprinkler, soaker, or the like. However, the type of fluid flow conduit (77) and the fluid flow meters (7) can take any desired configuration and can be scaled up or down depending on the fluid flow rates and pressures developed by the fluid flow generator (3). In particular embodiments, the fluid flow meters (7) can deliver an amount of fluid (6) at a fluid flow rate (92) of about 1 gallon/hour to about 2 gallons/hour; although this illustrative example is not intended to preclude lesser or great fluid flow rates.

Now referring primarily to FIGS. 10 through 13, embodiments can further include a fluid reservoir (5) including a reservoir bottom panel (78) joined to an interconnected plurality of reservoir side panels (79) upwardly extending to a reservoir rim (80). The fluid reservoir (5) can define an open ended interior space (81). In particular embodiments, the receptacle rim (12) and the reservoir rim (80) can be configured to removably mateably engage, disposing the receptacle bottom panel (10) joined to the interconnected plurality of receptacle side panels (11) inside of the fluid reservoir open ended interior space (81) with the fluid flow generator inlet (16) disposed proximate the reservoir bottom panel (78).

Now referring primarily to FIG. 1, a method in the watering system (1) can include supportingly engaging the receptacle (2) with the fluid reservoir (5). The method further including filling the fluid reservoir (5) while supportingly engaged to the receptacle (2) by passing an amount of fluid (6) through the passthrough conduit (27) defined by the interconnected plurality of receptacle side panels (11), which passthrough conduit (27) has open communication between the receptacle rim (12) and the receptacle bottom panel (10) allowing ingress of the amount of fluid (6) to the fluid reservoir interior space (82). For the purposes of this invention, the term "fluid" broadly encompasses any fluid, such as a liquid or a gas or a mixture thereof and in particular with limitation to the breadth of the foregoing encompasses water which may be a solvent for a wide variety of solutes, such as, nutrients, stimulators, or additives to increase plant growth.

The method can but, need not necessarily, further include operating a passthrough conduit cover (35) engaged with said passthrough conduit (27), the passthrough conduit cover (35) transitioning between a closed condition (83) and an open condition (84).

Again, referring primarily to FIG. 1, the method can further include operating a fluid flow generator (3) housed in the receptacle compartment (15) defined by the interconnected plurality of receptacle side panels (11) to generate a flow of a fluid (6) from a fluid flow generator inlet (16) disposed in the fluid (6) contained in the fluid reservoir (5) to a fluid flow generator outlet (17) disposed external to said fluid reservoir (5) to deliver the fluid (6) to the receptacle interior space (14) by which the fluid (6) can pass through the aperture element (13) in the receptacle bottom panel (10) to return to the fluid reservoir (5) or to one or more fluid flow meters (7) which can be positioned external to the receptacle interior space (14).

In particular embodiments, the method can further include operating a switchable toggle function of a controller (4) to transition said fluid flow generator (3) between an on condition (38) and an off condition (40). As to these embodiments, the controller (4) can compress a mechanical switch (41) which by user interaction electrically couples and uncouples the fluid flow generator (3) with a power source (42) which as above described can be one or both of a battery (43) and a photovoltaic solar panel (52). The method can further include programming a timer (86) of the controller (4) to delimit a period of time in which the fluid flow generator (3) operates in the on condition (38). The method can further include programming the timer (86) to adjust a start time (87) and a stop time (88) of the period of time in which the fluid flow generator (3) operates in the on condition (38). As to these embodiments, by user interaction with a user interface (89), a programmable microprocessor can be filled with the period of time or the start and stop times (87)(88) (or start and stop days and times) which automatically operates a mechanical switch (41) to transition the fluid flow generator (3) between the on condition (38) and the off condition (40).

Now referring primarily to FIGS. 1 and 2, particular embodiments of the method can further include mounting a solar panel (52) to the receptacle (2) or to a structure external to the receptacle (2).

Now referring primarily to FIG. 1, the method can further include, coupling one or more fluid flow conduits (77) to the fluid flow generator (3). Each of the fluid flow conduits (77) can, but need not necessarily, terminate in a fluid flow meter (7) to deliver the fluid (6) from the fluid reservoir (5) to each of the one or more fluid flow meters outlets (91) during the on condition (38) of said fluid flow generator (3). In particular embodiments, the method can further include selecting a fluid flow meter (7) for each of the one or more fluid flow meters outlets (91) from a plurality of fluid flow meters (7) each having different pre-determined fluid flow rates (92) during the on condition (38) of the fluid flow generator (3), and coupling the fluid flow meter (7) selected for each of the one or more fluid flow meters outlets (91) based on the pre-determined fluid flow rate (92) to a corresponding one of the one or more fluid flow meters outlets (91).

Now referring primarily to FIG. 1, the method can further include positioning the fluid flow conduit (77) and fluid flow meters (7) in three-dimensional configuration (93) surrounding the receptacle (2) to deliver fluid (6) to each of the fluid flow meters (7). In particular embodiments, the method further includes positioning the fluid flow meters (7) to water a corresponding one or more potted plants (9).

As can be easily understood from the foregoing, the basic concepts of the present invention may be embodied in a variety of ways. The invention involves numerous and varied embodiments of a watering system and methods for making and using such a water system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "fluid flow generator" should be understood to encompass disclosure of the act of "generating a fluid flow"—whether explicitly discussed or not—and, conversely, were there effectively disclosure of the act of "generating a fluid flow", such a disclosure should be understood to encompass disclosure of a "fluid flow generator" and even a "means for generating a fluid flow." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the watering systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An apparatus, comprising:
a fluid reservoir defining a fluid reservoir open ended interior space;
a receptacle including:
a receptacle bottom panel having an aperture element;
an interconnected plurality of receptacle side panels upwardly extending from said receptacle bottom panel to a receptacle rim supportingly engaged by said fluid reservoir, said receptacle side panels defining:
a receptacle open-ended interior space fluidically coupled to said fluid reservoir open ended interior space through said aperture element; and
a receptacle compartment formed by joining a compartment panel having a first compartment panel side edge opposing a second compartment panel side edge to a corresponding first pair of adjoining receptacle side panels, said receptacle compartment adjoined to said receptacle open ended interior space between said receptacle rim and said bottom panel;
a fluid flow generator disposed within said receptacle compartment, said fluid flow generator having an inlet and an outlet disposed external to said receptacle compartment; and
a passthrough conduit formed by joining a conduit panel having a first conduit panel side edge opposing a second conduit panel side edge to a corresponding second pair of adjoining receptacle side panels, said passthrough conduit adjoined to said receptacle open ended interior space between said receptacle rim and said bottom panel.

2. The apparatus of claim 1, further comprising a passthrough conduit cover which mateably engages said passthrough conduit.

3. The apparatus of claim 1, further comprising a controller including a toggle function to transition said fluid flow generator between an on condition and an off condition.

4. The apparatus of claim 3, wherein said controller further includes a timer which delimits periods of time in which said fluid flow generator operates in said on condition.

5. The apparatus of claim 4, wherein said timer comprises a programmable timer which can be programmed to adjust a start time and a stop time which delimits a period of time of said periods of time in which said fluid flow generator operates in said on condition.

6. The apparatus of claim 5, further comprising:
a battery electrically coupled to said controller; and
a solar panel electrically coupled to said controller, said controller further comprising an electrical source selector which functions to:
determine an amount of current generated by said solar panel; and
electrically couple said fluid flow generator to said battery or to said solar panel depending upon said amount of current generated by said solar panel.

7. The apparatus of claim 6, wherein said electrical source selector further functions to:
calculate a current generation value which varies based on said amount of current generated by said solar panel;
compare said current generation value to one or more current generation threshold values; and
electrically couple said fluid flow generator to said solar panel when said current generation value exceeds said one or more current generation threshold values.

8. The apparatus of claim 7, wherein said controller further comprises a battery charger which functions to charge said battery with said amount of current generated by said solar panel.

9. The apparatus of claim 5, further comprising a solar panel mount releasably mountable to said receptacle rim or a structure proximate said receptacle.

10. The apparatus of claim 3, further comprising a controller compartment adjoined to said open ended interior space between said receptacle rim and said bottom panel, said controller disposed inside of said controller compartment.

11. The apparatus of claim 1, wherein said fluid reservoir including a reservoir bottom panel joined to an interconnected plurality of reservoir side panels upwardly extending to a reservoir rim, said reservoir defining said fluid reservoir open ended interior space to receive said receptacle.

12. The apparatus of claim 11, wherein said receptacle rim is removably mateably engageable with said reservoir rim to releasably support said receptacle.

13. The apparatus of claim 1, further comprising a plurality of fluid flow meters coupled to said fluid flow generator outlet, each of said fluid flow meters delivers a pre-determined fluid flow in said on condition of said fluid flow generator.

* * * * *